United States Patent
Lavoie et al.

(10) Patent No.: US 7,700,019 B2
(45) Date of Patent: Apr. 20, 2010

(54) CO-EXTRUSION MANUFACTURING PROCESS OF THIN FILM ELECTROCHEMICAL CELL FOR LITHIUM POLYMER BATTERIES AND APPARATUS THEREFOR

(75) Inventors: Paul-André Lavoie, Montreal (CA); Richard Laliberté, Ste-Julie (CA); Jonathan Dubé, Laprairie (CA); Yvon Gagnon, Charlemagne (CA)

(73) Assignee: Bathium Canada Inc., Boucherville (CA)

( * ) Notice: Subject to any disclaimer, the term of this patent is extended or adjusted under 35 U.S.C. 154(b) by 195 days.

(21) Appl. No.: 10/725,059

(22) Filed: Dec. 2, 2003

(65) Prior Publication Data

US 2004/0159964 A1 Aug. 19, 2004

Related U.S. Application Data (60) Provisional application No. 60/430,083, filed on Dec. 2, 2002.

(51) Int. Cl.
C04B 35/00 (2006.01)
B29C 47/06 (2006.01)
B32B 37/00 (2006.01)
H01M 6/00 (2006.01)
H01M 10/00 (2006.01)

(52) U.S. Cl. ............ 264/104; 264/40.1; 264/105; 264/171.13; 264/171.14; 264/171.17; 264/171.18; 264/171.19; 264/173.12; 264/173.16; 264/177.16; 264/407; 425/113; 425/113.5; 429/122; 429/231.95; 429/322

(58) Field of Classification Search ............ 264/171.18, 264/177.16
See application file for complete search history.

(56) References Cited

U.S. PATENT DOCUMENTS

| | | | | |
|---|---|---|---|---|
| 3,544,669 A | * | 12/1970 | Schock | 264/171.13 |
| 4,247,504 A | * | 1/1981 | Karppo | 264/171.18 |
| 4,260,566 A | * | 4/1981 | Brouwer et al. | 264/408 |
| 4,386,019 A | | 5/1983 | Kaun et al. | |
| 4,448,739 A | * | 5/1984 | Baus | 264/132 |
| 5,100,746 A | | 3/1992 | Muller et al. | |

(Continued)

FOREIGN PATENT DOCUMENTS

DE    92 16 086.7    4/1993

(Continued)

*Primary Examiner*—Jeffrey Wollschlager
(74) *Attorney, Agent, or Firm*—Osler, Hoskin & Harcourt LLP (57) ABSTRACT

A process of co-extrusion of a thin electrode sheet with a thin electrolyte polymer sheet directly onto a current collector sheet for a lithium polymer battery. The process includes the steps of:
(a) mixing a polymer with active electrode material, lithium salt and electronic conductive material in a first mixing chamber to form an electrode slurry;
(b) mixing a polymer with a lithium salt in a second mixing chamber to form an electrolyte slurry;
(c) feeding the electrode slurry through a first flow channel and the electrolyte slurry through a second flow channel;
(d) extruding the electrode slurry in the form of a thin electrode sheet through a first die opening connected to the first flow channel, the electrode slurry being extruded directly onto a current collector sheet; and
(e) concurrently extruding the electrolyte slurry in the form of a thin electrolyte sheet through a second die opening adjacent to the first die opening and connected to the second flow channel, the thin electrolyte sheet being extruded directly onto the thin electrode sheet.

10 Claims, 8 Drawing Sheets

U.S. PATENT DOCUMENTS

| | | | |
|---|---|---|---|
| 5,316,556 A * | 5/1994 | Morris | 29/623.3 |
| 5,360,684 A | 11/1994 | Duval et al. | |
| 5,516,397 A * | 5/1996 | Takano et al. | 156/244.23 |
| 5,536,278 A | 7/1996 | St-Amant et al. | |
| 5,593,462 A | 1/1997 | Gueguen et al. | |
| 5,674,556 A * | 10/1997 | Fukumura et al. | 427/113 |
| 5,697,145 A * | 12/1997 | Fukumura et al. | 29/623.5 |
| 5,725,822 A * | 3/1998 | Keller et al. | 264/211.11 |
| 5,834,052 A * | 11/1998 | Fukumura et al. | 427/58 |
| 5,866,051 A * | 2/1999 | Lin et al. | 264/45.9 |
| 6,264,707 B1 | 7/2001 | Ishikawa et al. | |
| 6,291,091 B1 * | 9/2001 | Preischl et al. | 429/30 |
| 6,403,266 B1 * | 6/2002 | Kim et al. | 429/314 |
| 6,503,432 B1 * | 1/2003 | Barton et al. | 264/173.16 |
| 6,676,865 B2 * | 1/2004 | Kobayashi et al. | 264/45.9 |
| 2004/0029008 A1 * | 2/2004 | Winterberg et al. | 429/231.1 |
| 2004/0159964 A1 * | 8/2004 | Lavoie et al. | 264/40.1 |

FOREIGN PATENT DOCUMENTS

| | | |
|---|---|---|
| DE | 101 18 639 A1 | 10/2002 |
| WO | WO 95/19052 | 7/1995 |
| WO | WO 01/82403 A1 | 11/2001 |
| WO | WO 01/84659 A1 | 11/2001 |

\* cited by examiner

CO-EXTRUSION MANUFACTURING PROCESS OF THIN FILM ELECTROCHEMICAL CELL FOR LITHIUM POLYMER BATTERIES AND APPARATUS THEREFOR

CROSS-REFERENCE TO RELATED APPLICATION

This application claims the priority of U.S. provisional application Ser. No. 60/430,083, filed on Dec. 2, 2002.

FIELD OF INVENTION

The present invention relates generally to lithium polymer batteries and more specifically to a manufacturing process for extruding and assembling components of electrochemical cells for lithium polymer batteries.

BACKGROUND OF THE INVENTION

Rechargeable batteries manufactured from laminates of solid polymer electrolytes and sheet-like anodes and cathodes display many advantages over conventional liquid electrolyte batteries. These advantages include lower overall battery weight, high power density, high specific energy, longer service life, as well as being environmentally friendly since the danger of spilling toxic liquid into the environment is eliminated.

Solid lithium polymer battery components include positive electrodes, negative electrodes and an insulating material capable of permitting ionic conductivity, such as a solid electrolyte consisting of a polymer and a lithium salt sandwiched between the positive and negative electrodes. The anodes or negative electrodes are usually made of light-weight metals foils, such as alkali metals and alloys, typically lithium metal, lithium oxide, lithium-aluminum alloys and the like. The composite cathodes or positive electrodes are usually formed of a mixture of active material such as transitional metal oxide, an electrically conductive filler, usually carbon particles, and an ionically conductive polymer electrolyte material, the mixture being set on a current collector, which is usually a thin sheet of aluminum. Since solid polymer electrolytes are less conductive than liquid polymer electrolytes, solid or dry electrochemical cells must be prepared from very thin films (total thickness of approximately 50 to 250 microns) to compensate the lower conductivity with high film contact surfaces and to provide electrochemical cells with high power density.

Composite cathode thin films are usually obtained by solvent coating onto a current collector or by melt extrusion. Similarly, the polymer electrolyte separator layer is typically produced by solvent coating or by melt extrusion.

Solid lithium polymer electrochemical cells are typically manufactured by separately preparing the positive electrode, the electrolyte separator and the negative electrode. The positive electrode is initially coated onto a metallic foil (for example aluminum) or onto a metallized plastic film, which serves as a current collector. The polymer electrolyte is coated onto a plastic substrate, such as a film of polypropylene. The positive electrode is thereafter laminated onto one face of the electrolyte, then the plastic substrate is removed from the second face of the electrolyte and the lithium negative electrode is applied thereon. This manufacturing process which is reasonably efficient for research and development and small scale production of lithium polymer electrochemical cells is inadequate for large scale production. U.S. Pat. No. 5,536,278 to Armand et al. disclosed one such method of assembling the various components of a solid lithium polymer electrochemical cells.

U.S. Pat. No. 5,100,746 to Gauthier disclosed a method of laminating simultaneously a plurality of layers of components of an electrochemical cell that is adapted to speed up the manufacturing process, wherein double-layer solid polymer electrolyte/composite positive electrode sub-assemblies are subsequently associated with the other constituent layers of the electrochemical cell. However, the double-layer solid polymer electrolyte/composite positive electrode sub-assemblies are previously produced by successive lamination of positive electrodes and solid polymer electrolytes.

In order to improve the efficiency of the production process for large scale manufacturing of lithium polymer batteries, there is a need for a faster yet reliable method and apparatus for the production of multiple-layer solid polymer electrolyte/composite positive electrode sub-assemblies for thin film solid lithium polymer electrochemical cells.

SUMMARY OF THE INVENTION

It is therefore an object of the present invention to provide an improved method of making and assembling components of a thin film solid lithium polymer electrochemical cell.

It is another object of the present invention to provide an apparatus for simultaneously making and assembling components of a thin film solid lithium polymer electrochemical cell.

As embodied and broadly described herein, the invention provides a process of co-extrusion of a thin electrode sheet with a thin electrolyte polymer sheet directly onto a current collector sheet for a lithium polymer battery, the process comprising the steps of:

(a) mixing a polymer with active electrode material, lithium salt and electronic conductive material in a first mixing chamber to form an electrode slurry;

(b) mixing a polymer with a lithium salt in a second mixing chamber to form an electrolyte slurry;

(c) feeding the electrode slurry through a first flow channel and the electrolyte slurry through a second flow channel;

(d) extruding the electrode slurry in the form of a thin electrode sheet through a first die opening connected to the first flow channel, the electrode slurry being extruded directly onto a current collector sheet; and (e) extruding the electrolyte slurry in the form of a thin electrolyte sheet through a second die opening adjacent to the first die opening and connected to the second flow channel; the thin electrolyte sheet being extruded directly onto the thin electrode sheet.

As embodied and broadly described herein, the invention also provides an apparatus for co-extruding components of an electrochemical cell of a lithium polymer battery onto a current collector sheet, the apparatus comprising a plurality of passageways linking a plurality of extruders to at least one die; the at least one die having at least two flow channels connected to at least two die openings, the at least one die adapted to extrude distinct sheets of material onto a current collector sheet.

BRIEF DESCRIPTION OF THE DRAWINGS

The invention will be better understood and other advantages will appear by means of the following description and the following drawings in which.

DETAILED DESCRIPTION

In general, the production of thin sheets of polymer electrolyte separator and thin sheets of composite cathode thin sheets is most efficient by melt extrusion through a slit die. The various constituents of the electrolyte separator or of the composite cathode are fed from one or more hoppers into an extruder, where they are melted, mixed and transported through an air tight cylinder via a mixing screw. The molten material is extruded toward the slit die and discharged through an elongated discharge port of the slit die at a constant rate onto a substrate sheet or film, where the slit die is adjusted to the desired thickness of film or sheet. Electrolyte separator and composite cathode materials are different from typical thermoplastic resins for instance and are difficult to extrude as some of their constituents remain in solid form through the melting step of the extrusion process. Furthermore, polymers of the polyether family, such as polyethylene oxide, have low melting points and become unstable under normal extrusion conditions such as high temperature and high shear conditions. As disclosed in co-pending U.S. application No. 60/362,079 which is hereby incorporated by reference, the applicants were able to solve the problems associated with the extrusion process of such material and, based on their ability to reliably extrude composite cathode thin sheets and electrolyte polymer separator thin sheets, have further improved the production process of thin film or sheet electrochemical cells as is described below.

To further improve the production process, multiple discharge slot dies were developed such that a composite cathode thin sheet and an electrolyte polymer separator thin sheet may be extruded concurrently onto a substrate such as a current collector. The current collector for the cathode material is typically a thin aluminum foil, nickel foil, iron or stainless steel foil or a polypropylene substrate with a thin layer of conductive metal particles thereon. The so-called co-extrusion production process may further comprise optical and/or ultra-sonic and/or Gamma gauges and/or Beta gauges measuring devices or any suitable measuring devices known to those skilled in the art adapted to measure the thickness of the various layers being extruded to ensure that the extruded layers remain within strict tolerances.

Figure 1:
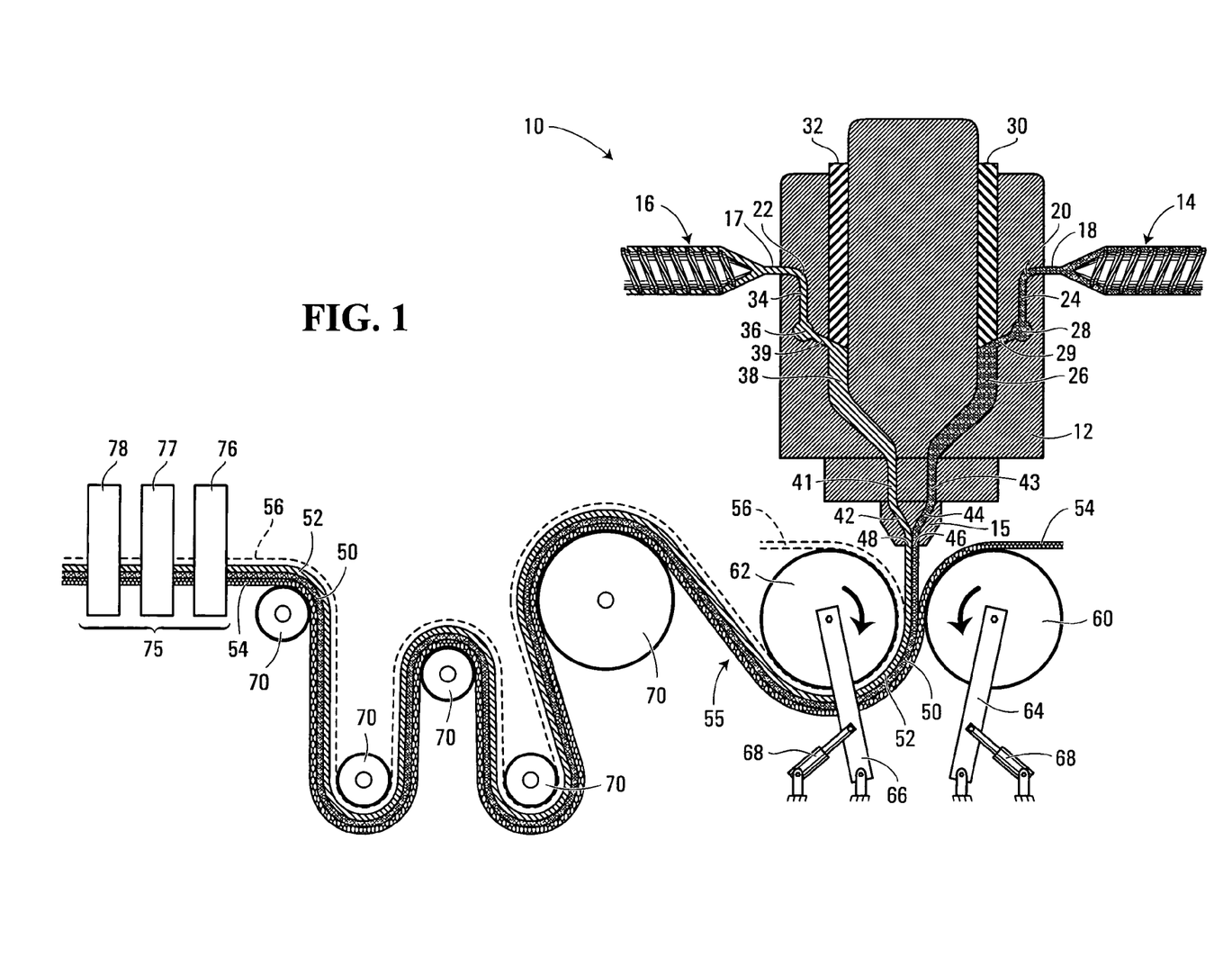
FIG. 1 is a schematic frontal cross-sectional view of a co-extrusion apparatus according to a first embodiment of the invention.

With reference to FIG. 1, there is shown an co-extrusion apparatus 10 according to a first embodiment of the invention adapted to produce mono-face current collector/cathode/electrolyte laminates. Co-extrusion apparatus 10 comprises a main structural body 12 to which is connected a first extruder 14, a second extruder 16 and a double slot die 15. First extruder 14 mixes and extrudes composite cathodic material and second extruder 16 mixes and extrudes polymer electrolyte material.

A pair of inner passageways 20 and 22 link the exit ports of extruders 14 and 16 to double slot die 15. The exit port 18 of extruder 14 is aligned with inner passageway 20, through which molten material fed from extruder 14 is directed toward double slot die 15. The exit port 17 of extruder 16 is aligned with inner passageway 22, through which molten material fed from extruder 16 is directed toward double slot die 15. Passageway 20 is divided into two main sections 24 and 26. Section 24 comprises an expansion chamber 28 adapted to regulate the flow of molten material; from expansion chamber 28, the molten material is fed into a wider section 26 leading directly into double slot die 15. Section 26 of passageway 20 comprises a tubular ram 30, whose diameter is equal to that of section 26 and is adapted to move into the path of the molten material to partially block the exit port 29 of section 24, thereby regulating the flow of molten material fed into double slot die 15. The motion of tubular ram 30 is controlled by either a hydraulic motor or an electric motor, capable of exact positioning of the tubular ram 30 relative to exit port 29. The electric or hydraulic motor is connected to a control system that regulates the debit of molten material in response to various parameters, which are described further down. Similarly, passageway 22 is divided into two main sections 34 and 38. Section 24 comprises an expansion chamber 36 adapted to regulate the flow of molten material fed from extruder 16; from expansion chamber 36, the molten material is fed at constant pressure into a wider section 38 leading directly into double slot die 15. Section 38 of passageway 22 comprises a tubular ram 32 adapted to move into the path of the molten material and partially block the exit port 39 of section 34, thereby regulating the flow of molten material fed into double slot die 15.

Double slot die 15 is mounted onto the main structural body 12 of co-extrusion apparatus 10. Double slot die 15 comprises a pair of flow channels 42 and 44 aligned with the exit ports 41 and 43 respectively. Flow channels 42 and 44 are shaped as fish tails or coat hangers to reconfigure the flow of each molten material into a thin film, which exit through adjacent slit openings 46 and 48 calibrated to the desired thickness of extruded films ranging from 10 to 100 Microns. The slit openings 46 and 48 may be calibrated during machining of the double slot die 15 or provided with adjustments for fine tuning, as is well known in the art of die making. Slit opening 46 is calibrated or adjusted to discharge a cathode thin sheet of about between 20 and 80 microns and slit opening 48 is calibrated or adjusted to discharge an polymer electrolyte separator of about between 10 and 50 microns, depending on the end use of the electrochemical cell to be produced. It is understood that double slot die 15 may be calibrated or adjusted to any thickness required; however, the efficiency of the electrochemical cells being produced is maximized with very thin sheets. When calibrated slit openings are worn such that the thickness of the extruded thin sheets exceeds a set tolerance by, for example, 5 microns, the entire double slot die 15 is replaced. Co-extrusion apparatus 10 may be equipped with a turret (not shown) comprising two or more double slot dies 15, such that rotation of the turret will align a new double slot die 15 with exit ports 41 and 43 and co-extrusion may resume with minimal delay when the die must be replaced. The worn out die is removed from the turret and a new die installed in its place without undue interruption of production.

A continuous composite cathode thin sheet 50 of, for example, 60 μm±5 μm exits slit opening 46 and is deposited directly onto a moving current collector thin sheet 54. Current collector 54 may be a thin metallic foil of, for example, 15-50 μm, or a thin metallized polymer film of similar thickness. Simultaneously, a continuous polymer electrolyte separator thin sheet 52 of for example 25 μm±5 μm exits slit opening 48 and is deposited onto the composite cathode thin sheet 50. As shown in FIG. 1, in a preferred embodiment of the co-extrusion manufacturing process, the assembly of current collector/composite cathode/electrolyte separator 55 immediately passes between a pair of flat cylinder rollers 60 and 62 driven at constant speed, flat cylinder roller 60 driving current collector 54 at a set speed. Flat cylinder rollers 60 and 62 are mounted on pivotal support structure 64 and 66, each having an hydraulic cylinder 68 adapted to adjust the exact position of the cylinder rollers 60 and 62 and also to adjust the pressure applied onto assembly 55 as it passes between the cylinder rollers 60 and 62 it is understood that other means and constructions for adjusting the position of the cylinder rollers 60 and 62 and the pressure applied on the assembly 55 by the cylinder rollers 60 and 62 are contemplated and within the reach of a person skilled in the art and as such are within the scope of the present invention. The pressure applied by cylinder rollers 60 and 62 helps to promote adhesion of the various layers of assembly 55 together. To prevent adhesion of the electrolyte separator thin sheet 52 to flat cylinder roller 62, flat cylinder roller 62 may be maintained at temperatures below the ambient temperature and preferably at a temperature ranging from −40° C. to 10° C. To prevent adhesion, flat cylinder roller 62 may also be provided with an anti-adhesive liner.

As a variant of the co-extrusion manufacturing process, the extruded cathode sheet 50 and electrolyte sheet 52 may be stretched onto current collector 54 in order to marginally reduce the overall thickness of assembly 55. The stretching is achieved by selecting the speed at which the current collector 54 travels at the contact point between the extruded cathode material 50 and the current collector 54, such that the speed of current collector 54 exceeds the rate of discharge of double slot die 15. The speed differential between the current collector 54 and the cathode material exiting slit die opening 46 marginally stretches the extruded cathode sheet 50, thereby reducing its thickness and consequently the overall thickness of assembly 55. Since the current collector may be a very thin metallic foil such as aluminum foil of 25 μm, stretching cathode sheet 50 with speed differential may cause ripping of the metallic foil, in which case it is no longer feasible.

In a variant, a polypropylene thin sheet 56 shown in dotted lines is added on the side of the polymer electrolyte separator sheet 52 to protect the electrolyte separator. The polypropylene thin film 56 is removed prior to lamination of an anode film on the electrolyte separator layer, as described in U.S. Pat. No. 5,100,746 which is hereby incorporated by reference in its entirety. Although optional, when assembly 55 is brought to a further processing station where an anode film is laminated over assembly 55, the polypropylene thin sheet 56 is important for storing assembly 55 into rolls for future use.

Assembly 55 winds through a series of rollers 70 to maintain a set tension on the continuous sheets and is brought to a measuring station 75 comprising a series of mechanical, optical, ultra sonic, Gamma or Beta measuring devices to control the thickness of the various layers of assembly 55. In this particular embodiment, there are two layers to be measured; cathode sheet 50 and electrolyte separator sheet 52. Therefore, measuring station 75 comprises three measuring devices 76, 77 and 78. The first measuring device 76 measures the overall thickness of the entire assembly 55, including current collector 54, cathode sheet 50, electrolyte separator sheet 52 and, optionally, polypropylene sheet 56. Note that the current collector 54 and, when used, polypropylene sheet 56 are known quantities. The second measuring device 77 is for example an optical device calibrated to measure the thickness of electrolyte separator sheet 52, which is a material allowing light transmission. A Light wave is sent though electrolyte sheet 52 at an angle. A portion of the light wave is reflected off the first surface of electrolyte sheet 52 and a portion of the light wave is transmitted through electrolyte sheet 52 and is reflected by the second surface of electrolyte sheet 52. The two light reflections are received by optical measuring device 77, which calculates the perpendicular thickness of electrolyte sheet 52. If a polypropylene sheet 56 is used, the light reflected off its surfaces may be discarded. The third measuring device 78 is an ultra sonic, Gamma or Beta device calibrated to measure the thickness of cathode sheet 50. Because the cathodic material layer is opaque, these types of waves are better suited to measure its thickness.

Measuring devices 76, 77 and 78 are linked to an electronic control unit such as a computer which is continuously fed data representative of the thickness of electrolyte sheet 52 and of cathode sheet 50. This data is monitored by comparing it to pre-set thickness tolerances. When a thickness measurement falls outside the pre-set tolerances, an alarm signal is sent and the double slot die 15 may be adjusted manually by an operator receiving the alarm signal, or replaced altogether as previously described with a rotation of the die turret to change the double slot die 15. The electronic control unit also monitors trends in the thickness measurement data received. The electronic control unit is linked to the system controlling the debit of molten material through passageways 20 and 22 via the motors controlling the position of both tubular rams 30 and 32, and to the system controlling the speed and pressure of cylindrical roller 60 and 62. The debit of cathode and electrolyte material may also be adjusted directly at the extruder's level by marginally increasing or decreasing the flow rate adjusting the throughput of the pumping device. The variables of debit, speed and pressure of rollers may be adjusted according to signals received from the electronic control unit, with the effect of providing minor adjustments to the thickness of electrolyte sheet 52 and of cathode sheet 50. Other means of controlling the debits of cathode material and electrolyte material other than the illustrated tubular rams are possible and contemplated and within the competence of the skilled technician. Examples of such means are numerous and include valves and adjustable restrictions of the passageways or exit ports or even at the die exit.

For example, a detected increase in the thickness of cathode sheet 50 may be compensated by a decrease in the debit of molten cathodic material, which is effected by moving tubular ram 30 thereby partially blocking the flow of molten material through the exit port 29 of section 24 of passageway 20, and simultaneously decreasing the flow rate of extruder 14 gear pump. Furthermore, the speed of current collector 54 may also be marginally increased by increasing the speed of rollers 60 and 62 to increase the stretching of cathode sheet 50. Various responses to deviating thickness of electrolyte sheet 52 and cathode sheet 50 are pre-programmed, stored into memory, retrieved and initiated when corresponding thickness measurement data are received. Although limited, the ability of the system to effect minute adjustments of the thickness of electrolyte sheet 52 and cathode sheet 50 improves the quality of the final product.

Obviously, other means of measuring the thickness of the co-extruded layers are contemplated and well within the scope of the disclosed invention. The measurement is used to provide quality control of the co-extruded sheets and also to provide references for minute adjustments of the co-extrusion process.

Figure 2:
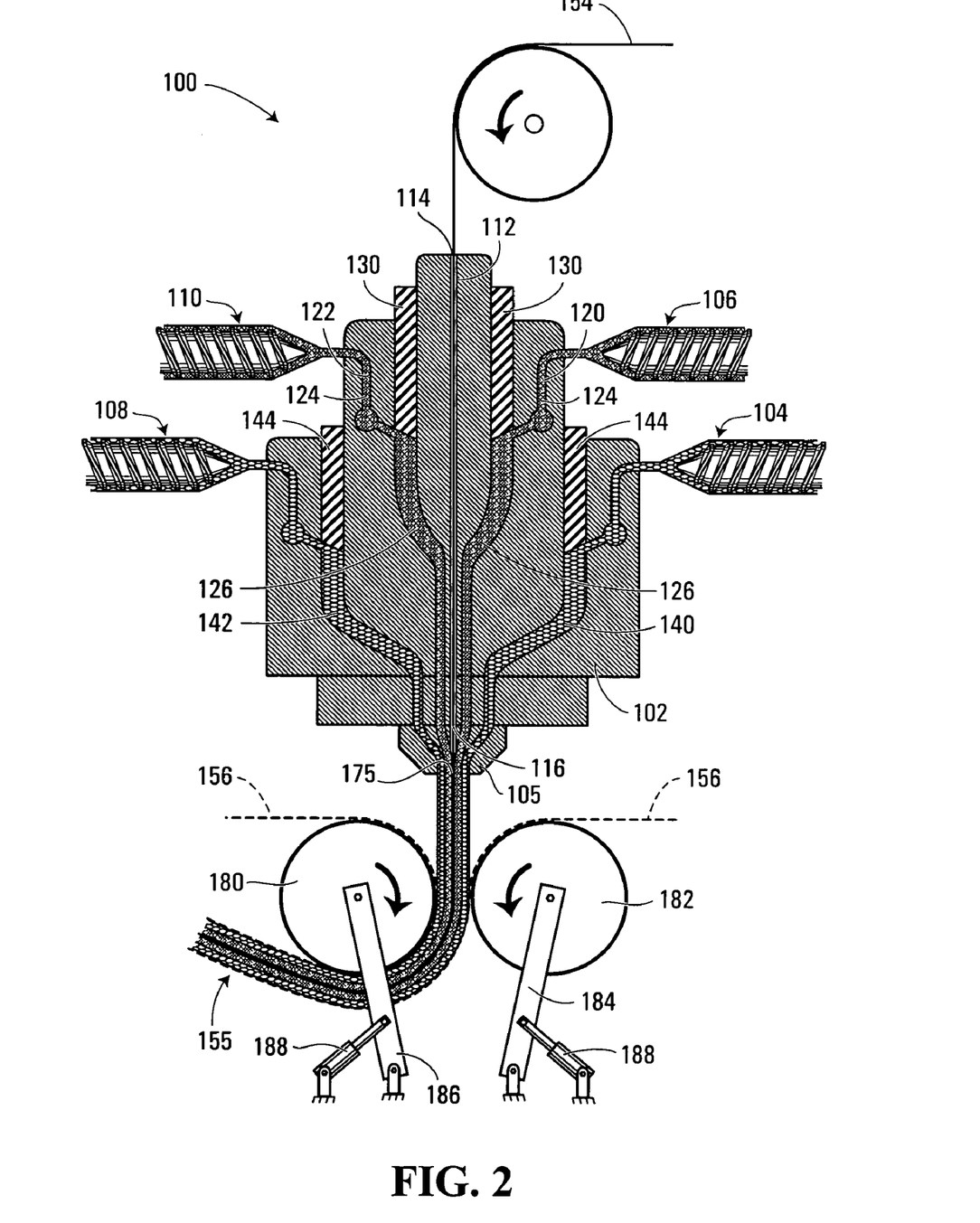
FIG. 2 is a schematic frontal cross-sectional view of a co-extrusion apparatus according to a second embodiment of the invention.

With reference to FIG. 2, there is shown a co-extrusion apparatus 100 according to a second embodiment of the invention, adapted to produce bi-face current collector/cathode/electrolyte separator laminates. Co-extrusion apparatus 100 comprises a main structural body 102, to which are connected four extruders 104, 106, 108 and 110 and a multiple slots die 105 mounted at the discharged end of co-extrusion apparatus 100. Extruders 106 and 110 mix and extrude composite cathodic material. Extruders 104 and 108 mix and extrude polymer electrolyte material. Co-extrusion apparatus 100 comprises a central passageway 112 adapted to guide a current collector thin sheet 154 directly into multiple slots die 105. Central passageway 112 extends the Length of co-extrusion apparatus 100, from a first end 114 which receives current collector sheet 154 to a second end 116 which guides current collector sheet 154 into multiple slots die 105.

Co-extrusion apparatus 100 comprises a first pair of inner passageways 120 and 122 linking the exit ports of extruders 106 and 110 to multiple slot die 105. The path of passageways 120 and 122 leads the extruded cathode material toward the central portion of multiple slot die 105 on each side of current collector 154, such that a sheet of extruded cathode material will be laid directly onto each side of current collector 154. Passageways 120 and 122 are divided into two main sections 124 and 126. Sections 124 comprises expansion chambers adapted to regulate the flow of the molten cathode material; from expansion chamber, the molten cathode material is fed into the wider sections 126 leading directly into multiple slot die 105. Each section 126 comprises a tubular ram 130 whose diameter is equal to that of section 126 and is adapted to move into the path of the molten cathode material to partially block the exit ports of sections 124, thereby regulating the flow of molten cathode material fed into multiple slot die 105. The motion of tubular rams 130 is control by either a hydraulic motor or an electric motor (not shown) capable of exact positioning of the tubular rams 130 relative to exit ports of sections 124. The electric or hydraulic motor is connected to a control system that regulates the debit of molten cathode material discharged by multiple slot die 105.

Co-extrusion apparatus 100 comprises a second pair of inner passageways 140 and 142 linking the exit ports of extruders 104 and 108 to multiple slot die 105. The path of passageways 140 and 142 leads the polymer electrolyte separator material toward the outer portions of multiple slot die 105 on each side of current collector 154, such that a sheet of polymer electrolyte material will be laid onto the previously laid cathode sheets on each side of current collector 154. Inner passageways 140 and 142 each comprise two distinct sections identical to inner passageways 120 and 122 and tubular rams 144 adapted to regulate the debit of molten polymer electrolyte material discharged by multiple slot die 105.

Figure 3:
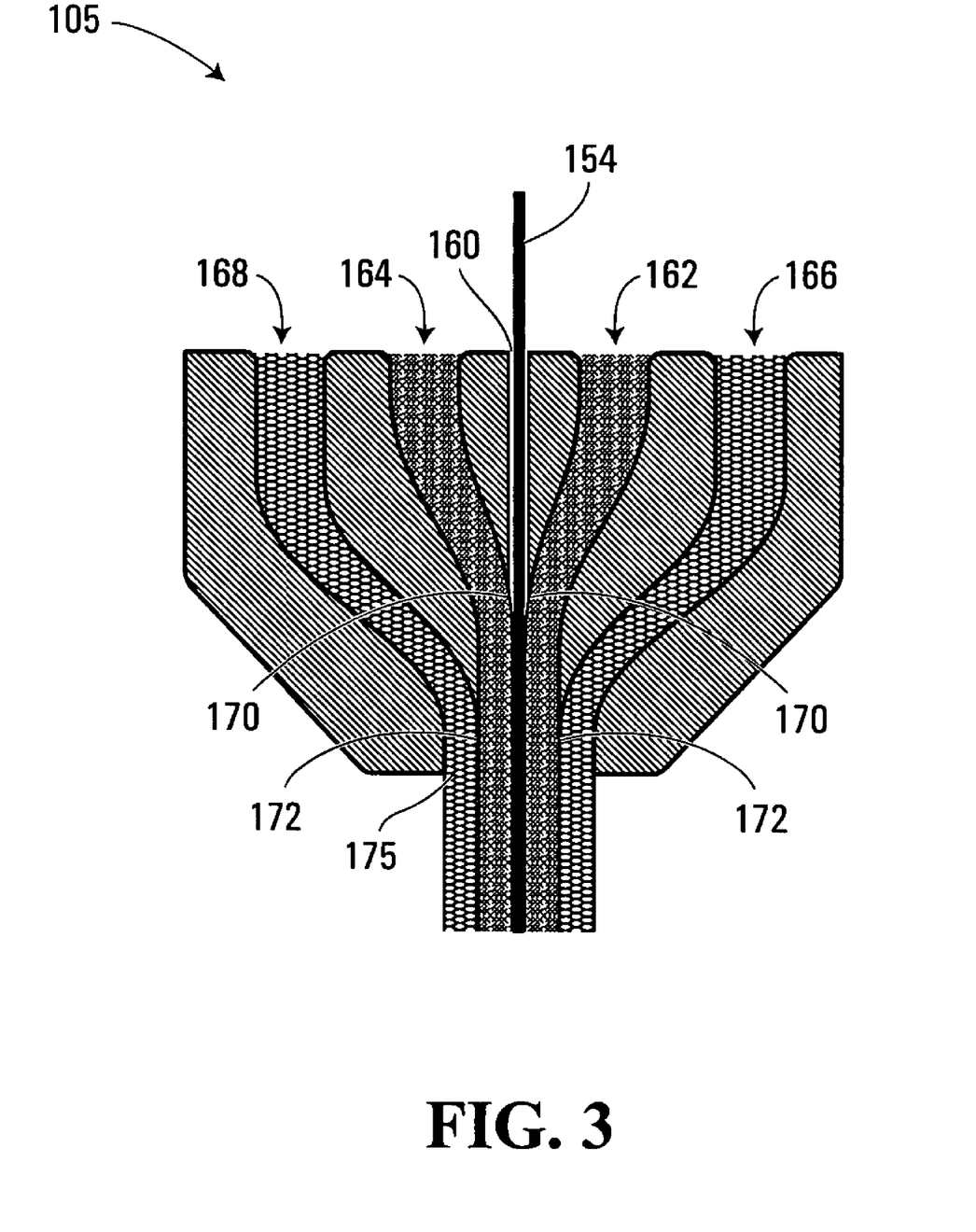
FIG. 3 is an enlarged cross-sectional view of a multiple slot die shown in FIG. 2 adapted for co-extrusion on each side of a current collector sheet.

As shown in FIG. 3, which is a cross-sectional view of multiple slot die 105, multiple slot die 15 comprises a central channel 160 that guides current collector sheet 154 toward the discharge end of multiple slot die 105. Multiple slot die 15 comprises four flow channels 162, 164, 166 and 168, each shaped as fish tails, coat hangers or any other flow channel designs known to those skilled in the art of die making to reconfigure the flow of extruded materials into a thin films. Flow channels 162 and 164 aligned with passageways 120 and 122 reshape and discharge the molten cathode material as thin film onto each side of current collector 154. Flow channels 166 and 168 aligned with passageways 140 and 142 reshape and discharge molten polymer electrolyte material as thin film onto the previously laid cathode material thin films.

Each flow channel 162, 164 comprises a discharge opening 170 calibrated to discharge a cathode thin sheet of about 20 to 80 µm (depending on end use) directly onto the moving current collector 154. Each flow channel 166, 168 comprises a discharge opening 172 positioned downstream from discharge openings 170 and calibrated to discharge an electrolyte separator thin sheet of about 10 to 50 µm (depending on end use) onto the previously laid cathode sheets. The discharge openings 170 and 172 may be calibrated during machining of die 105 or manually adjustable. Adjustments of discharge openings 170 and 172 may be incorporated into the design of multiple slot die 105 as is well know in the art of die making.

As shown in FIG. 2, a bi-face assembly 155 electrolyte/cathode/current collector/cathode/electrolyte emerges from discharge nozzle 175 and immediately passes between a pair of flat cylinder rollers 180 and 182 driven at constant speed, moving bi-face assembly 155 at a set speed. As previously described and illustrated in FIG. 1, flat cylinder rollers 180 and 182 are mounted on pivotal support structure 184 and 186, each having a hydraulic cylinder 188 adapted to adjust the exact position of the cylinder rollers 180 and 182 and the pressure applied onto bi-face assembly 155 as it passes between the cylinder rollers 180 and 182. It is understood that other means and constructions for adjusting the position of the cylinder rollers 180 and 182 and the pressure applied on the bi-face assembly 155 by the cylinder rollers 180 and 182 are contemplated and within the reach of a person skilled in the art and as such are within the scope of the present invention. The pressure applied by cylinder rollers 180 and 182 helps promote adhesion of the various layers of bi-face assembly 155 together. To prevent adhesion of the electrolyte separator layer of bi-face assembly 155 to flat cylinder rollers 180 and 182, each cylinder roller may be maintained at temperatures below the ambient temperature and preferably at a temperature ranging from −40° C. to 10° C. Alternatively, each cylinder roller is provided with an anti-adhesive liner.

Co-extrusion apparatus 100 may be equipped with a turret (not shown) comprising two or more multiple slot dies 105, such that rotation of the turret wilt align a new multiple slot die 105 with the exit ports of passageways 120, 122, 140, 142. In this embodiment, the extrusion process and the current collector are stopped for a few seconds so that the rotation of the turret cuts the current collector sheet 154 at the exit end 116 of co-extrusion apparatus 100. The cut end of current collector sheet 154 is fed though central channel 160 and reinserted between cylindrical rollers 180 and 182 such that co-extrusion may resume with minimal delay. The discarded die is removed from the turret and a newly calibrated or adjusted die installed in its stead without undue interruption of production.

As previously described for the co-extrusion of a monoface assembly illustrated in FIG. 1, a polypropylene thin film 156 shown in dotted lines may be added on each side of the bi-face assembly 155 to protect the electrolyte separator layers. The polypropylene thin films 156 are removed prior to lamination of anode films on each side of the bi-face assembly 155 as described in U.S. Pat. No. 5,100,746, which is hereby incorporated by reference in its entirety. Although not necessary, when bi-face assembly 155 is brought directly to a further processing station where an anode film is laminated on each side of bi-face assembly 155, the polypropylene thin films 156 are important for storing bi-face assembly 155 into rolls for future use.

Figure 4:
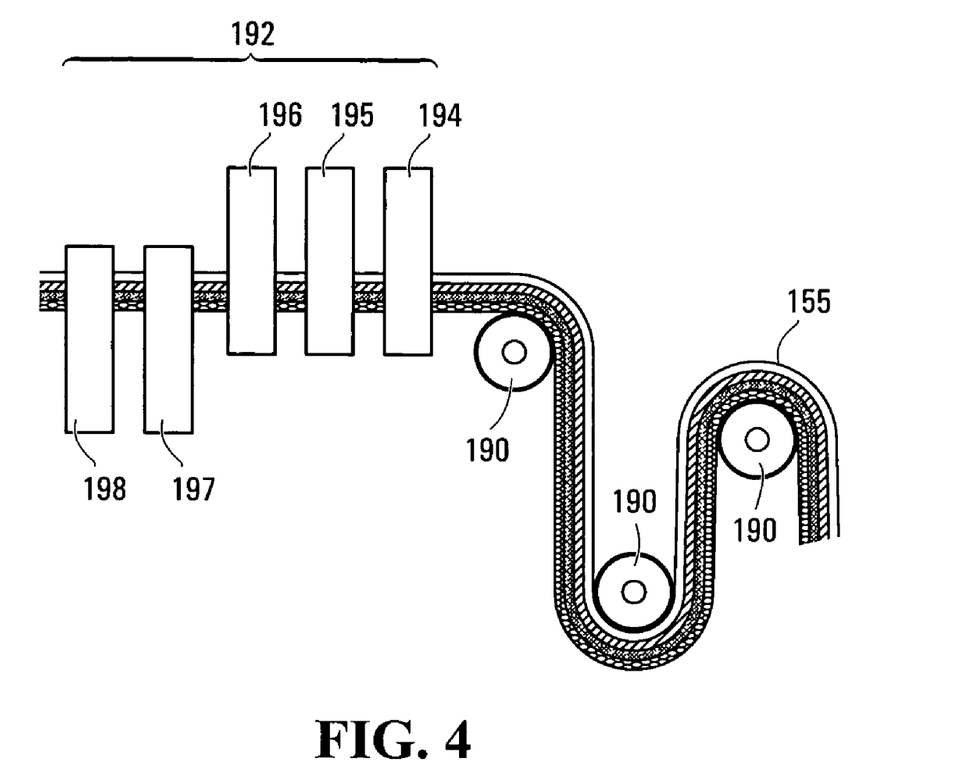
FIG. 4 is a schematic view of a measuring apparatus for measuring the thickness of a bi-face co-extrusion assembly.

As illustrated in FIG. 4, bi-face assembly 155 winds through a series of rollers 190 to maintain a set tension on the continuous sheets and is brought to a measuring station 192 comprising a series of mechanical, optical, ultra sonic, Gamma or Beta measuring devices to control the thickness of the various layers of bi-face assembly 155. In this particular embodiment, there are four layers to be measured; the cathode sheets on both sides of current collector 154 and the electrolyte separator sheets laid over each cathode sheets. Therefore, measuring station 192 comprises five measuring devices 194, 195, 196, 197 and 198. The first measuring device 194 measures the overall thickness of the entire bi-face assembly 155, including current collector 154, the two cathode sheets, the two electrolyte separator sheets and, optionally, the two polypropylene films 156. Note that current collector 154 and, when used, polypropylene sheets 156 are known quantities.

The second measuring device 195 is for example an optical device calibrated to measure the thickness of electrolyte separator sheet on a first side of bi-face assembly 155. A light wave is sent though the electrolyte layer at an angle; a portion of the light wave is reflected off the first surface of electrolyte layer and a portion of the Light wave is transmitted through electrolyte layer and is reflected by the second surface of electrolyte layer. The two light reflections are received by optical measuring device 195, which calculates the perpendicular thickness of electrolyte layer. If a polypropylene sheet 156 is used, the light reflected off its surfaces may be discarded. The third measuring device 196 is an ultra sonic, Gamma or Beta device calibrated to measure the thickness of cathode layer on the first side of bi-face assembly 155. Because the cathode material is opaque, ultra sonic Gamma or Beta waves are better suited to measure its thickness.

The fourth measuring device 197 is a device calibrated to measure the thickness of electrolyte separator sheet on the second side of bi-face assembly 155 and is identical to measuring device 195. The fifth and last measuring device 198 is a device calibrated to measure the thickness of cathode layer on the second side of bi-face assembly 155 and is identical to measuring device 196.

Measuring devices 194, 195, 196, 197, and 198 are individually linked to an electronic control unit, such as a computer, which is continuously fed data representative of the thickness of each cathode layers and each electrolyte layers. This data is monitored by comparing it to pre-set thickness tolerances. When a thickness measurement fall outside the pre-set tolerances, an alarm signal is sent and the multiple slot die 105 is either adjusted manually by a machine operator or replaced. The electronic control unit also monitors trends in the thickness measurements data received. The electronic control unit is linked to the system controlling the debit of molten material through the various passageways 120, 122, 140, and 142 via the motors controlling the position of both tubular rams 130 and 144, and to the system controlling the speed and pressure of cylindrical roller 180 and 182. The debit of cathode and electrolyte material may also be adjusted directly at the extruder's level by marginally increasing or decreasing the flow rate by adjusting the throughput of the extruder(s) pumping device(s). The variables of debit, speed and pressure of rollers may be adjusted according to signals received from the electronic control unit with the effect of providing minor adjustments to the thickness of the electrolyte layers and of the cathode layers of assembly 155. As previously mentioned, other means of controlling the debits of cathode material and electrolyte material other than the illustrated tubular rams are possible and contemplated and within the competence of the skilled technician. Examples of such means are numerous and include gear pumps adjustments, valves and adjustable restrictions of the passageways or exit ports 116 or even at the die exit.

Figure 5:
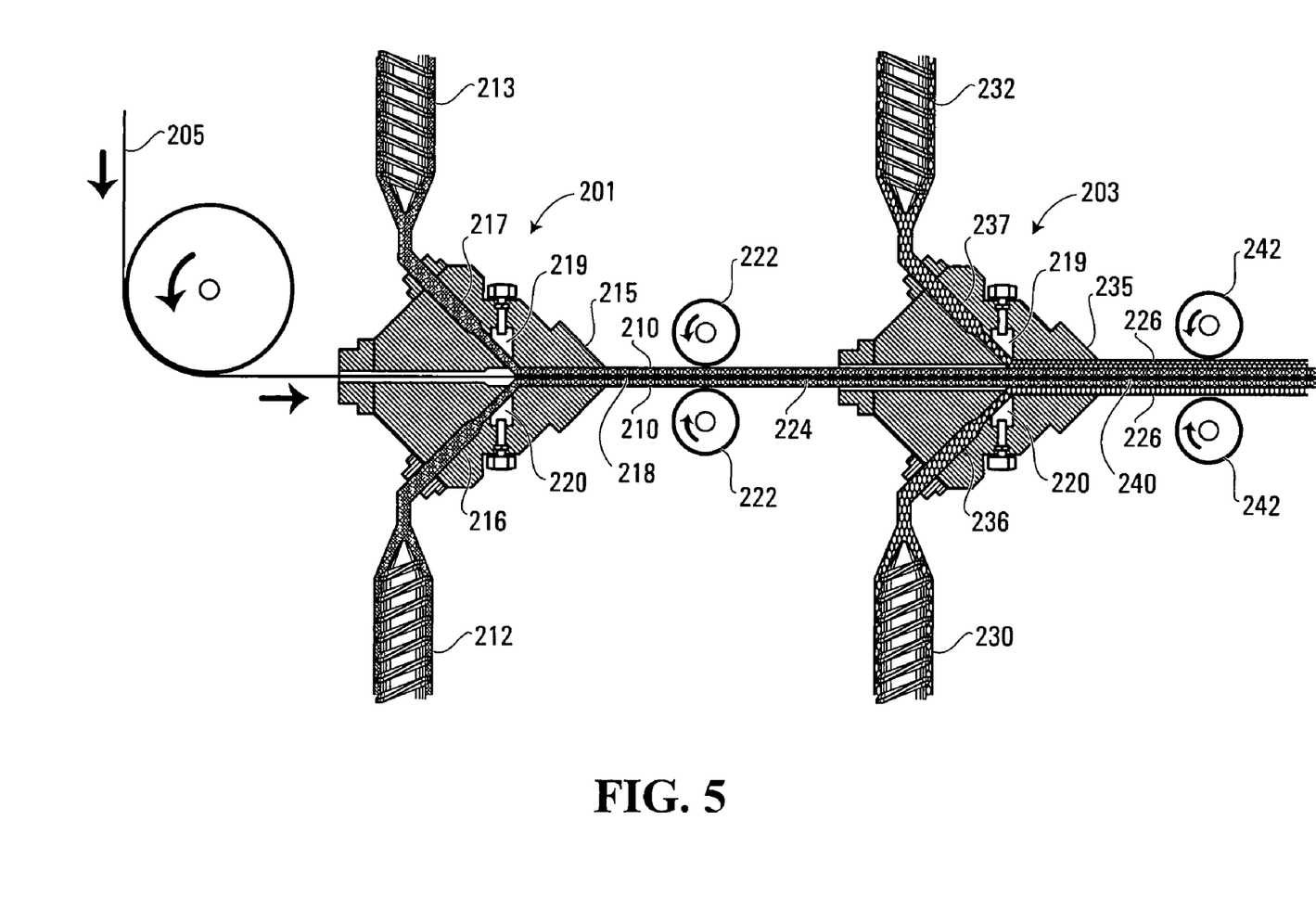
FIG. 5 is a schematic cross-sectional view of a pair of co-extrusion apparatus according to a third embodiment of the invention positioned one after the other along the traveling path of a current collector.

FIG. 5 illustrates another variant of the invention, where two extrusion stations 201 and 203 are positioned adjacent one another along the path of a current collector 205. Extrusion station 201 is adapted to lay directly onto current collector 205 a first layer of extruded cathode material 210 on both sides of current collector 205. Extrusion station 201 comprises two extruders 212 and 213 mixing and extruding thin films of cathodic material as illustrated, but could easily comprise only one extruder with two feeding ports. Extruders 212 and 213 feed extruded cathodic material through an extrusion die 215 comprising a pair of flow channels 216 and 217 shaped as fish tails or coat hangers or any other shape that reconfigures the flow of extruded materials into a thin films. Flow channels 216 and 217 reshape the flow and discharge extruded cathode material as thin film onto each side of current collector 205. The flow channels are provided with thickness adjustment means 219 and 220 adapted to adjust the thickness of the cathode sheets being laid onto current collector 205. Adjustment means 219 and 220 are illustrated as mechanical but may also be hydraulically or electrically controlled. A primary assembly 218 comprising current collector 215 and two cathode sheets 210 exits die 215 and is compressed by a first pair of rollers 222 before entering second extrusion station 203 through an aperture 224 adapted to receive the marginally thicker primary assembly 218.

Extrusion station 203 is adapted to lay directly onto primary assembly 218 a second layer of extruded polymer electrolyte material 226 on both sides of primary assembly 218. Extrusion station 203 also comprises two extruders 230 and 232 mixing and extruding thin films of polymer electrolyte material as illustrated, but could easily comprise only one extruder with two feeding ports. Extruders 230 and 232 feed extruded polymer electrolyte material through an extrusion die 235 similar to extrusion die 215, although adjusted for primary assembly 218. Extrusion die 235 comprises a pair of flow channels 236 and 237 shaped as fish tails or coat hangers, which reconfigure the flow of extruded materials into a thin film. Flow channels 236 and 237 reshape the flow and discharge extruded polymer electrolyte material as thin film onto each side of primary assembly 218. The flow channels are provided with thickness adjustment means 219 and 220 adapted to adjust the thickness of the extruded electrolyte sheets being laid onto primary assembly 218. A multi-layer assembly 240 comprising current collector 215, two cathode sheets 210 and two polymer electrolyte sheets exits extrusion die 235 and is compressed by a second pair of rollers 242 to complete the bi-face current collector/cathode/electrolyte separator laminates.

In this particular embodiment, the co-extrusion process may be carried out while the current collector is traveling upwardly. Advantageously when the various layers are deposited onto a sheet of current collector traveling vertically in the upward direction, the extruded cathode and electrolyte materials are spread more evenly due to the equal action of gravity on each layer pulling down on the extruded material.

As in previously described embodiments, the co-extrusion apparatus illustrated in FIG. 5 may be complemented with mechanical, optical, ultra sonic, Gamma or beta measuring devices adapted to measure the thickness of the various layers. In this specific embodiment, two such measuring stations would be provided immediately after each co-extrusion apparatus 201 and 203, so that the initial measurement of the extruded cathode layers 210 is taken without the interference of the electrolyte layers 226. One or two electronic units such as computers receive the measurement data and adjust the extruders' flow rates, the thickness of the extruded sheets via adjustment means 219 and 220 and the pressure exerted by cylindrical rollers 222 and 242 in order to provide minute adjustments of the thickness of the various layers 210 and 226.

Figure 6:
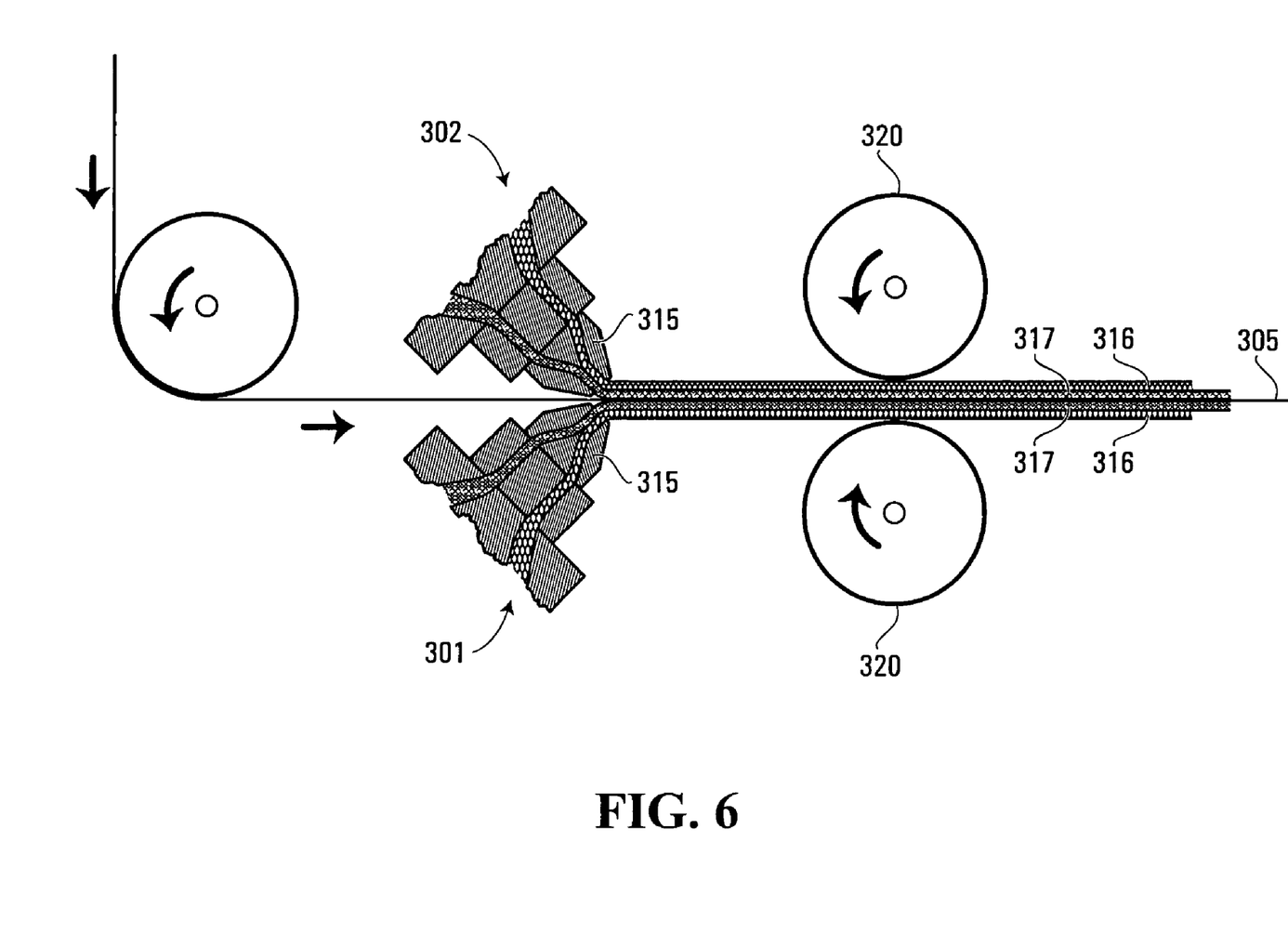
FIG. 6 is a schematic cross-sectional view of a pair of co-extrusion apparatus according to a fourth embodiment of the invention.

FIG. 6 illustrates another variant of a co-extrusion process and apparatus, in which two co-extrusion apparatuses 301 and 302 similar to co-extrusion apparatus 10 illustrated in FIG. 1 are positioned on each sides of a moving current collector 305. Each co-extrusion apparatus 301 and 302 comprises a double slot die 315 having a pair of flow channels 316 and 317. Flow channels 317 extrude thin sheets of cathode material directly onto each side of current collector 305, whereas flow channels 316 extrude a thin sheet of polymer electrolyte material over the previously laid cathode thin sheets. The discharge section of each double slot die 315 is angled relative to current collector 305 such that the extruded cathode sheets are properly laid first and then the electrolytes sheets are laid over the cathode sheets. Two cylindrical rollers 320 positioned directly after co-extrusion apparatus 301 and 302 apply a small pressure directly onto the surfaces of the electrolyte layers. As previously mentioned, the co-extrusion may be carried out with current collector 305 traveling vertically upward.

As in previously described embodiments, the co-extrusion apparatus illustrated in FIG. 6 may be complemented with precise measuring devices adapted to measure the thickness of the various layers. In this specific embodiment, a single measuring stations would be provided immediately after each co-extrusion apparatus 301 and 302, that measures the thickness of each extruded cathode layers and each electrolyte layers. One electronic unit such as computers receives the measurement data and adjust the extruders' speeds, the thickness of the extruded sheets via internal debit adjustment means (not shown) and the pressure exerted by cylindrical rollers 320 in order to provide minute adjustments of the thickness of the various extruded layers.

Figure 7:
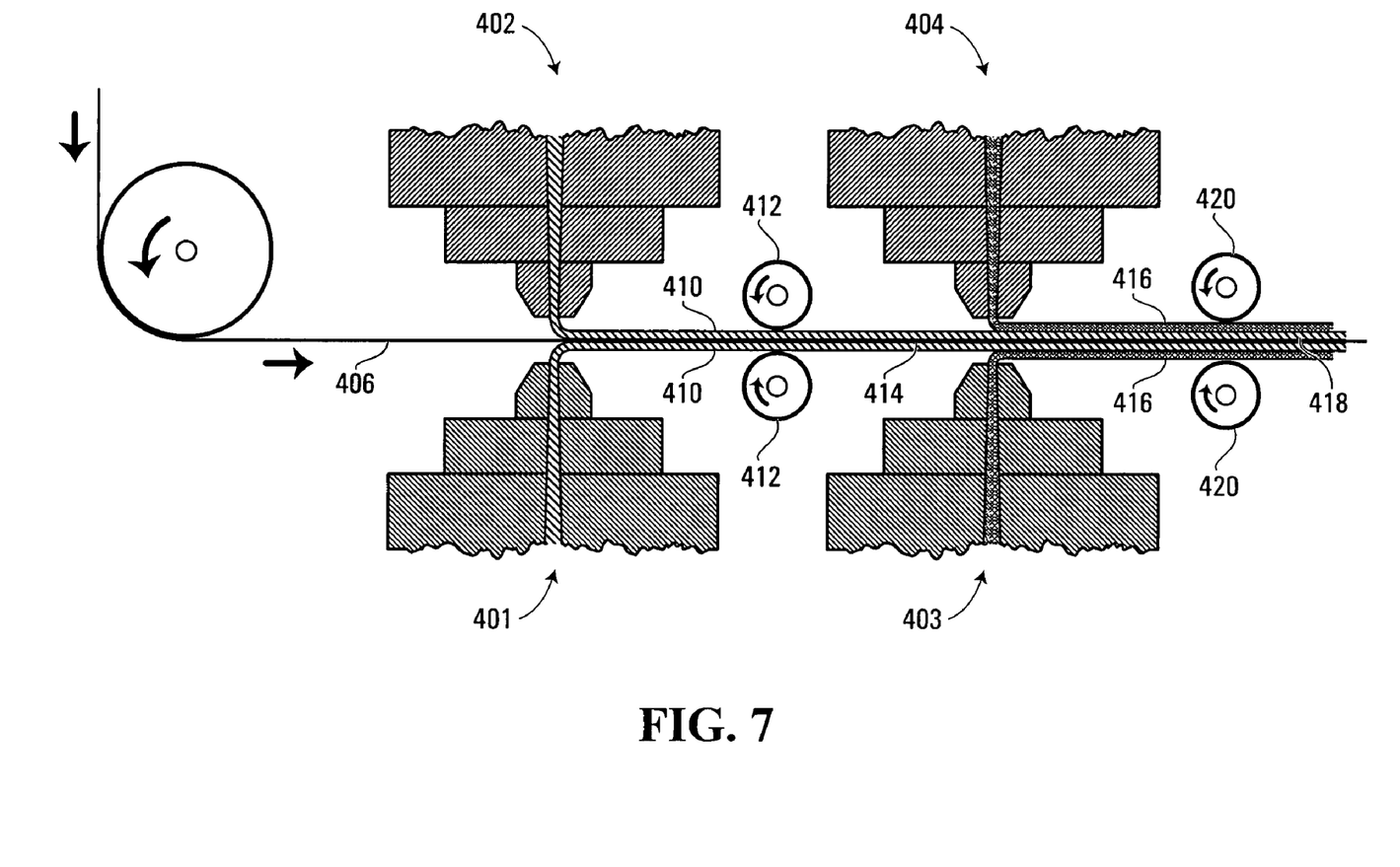
FIG. 7 is a schematic cross-sectional view of a co-extrusion apparatus according to a fifth embodiment of the invention.

FIG. 7 illustrates yet another variant of a co-extrusion process and apparatus, in which four extrusion apparatus 401, 402, 403 and 404 are positioned in pairs on each side of a moving current collector 406. The first pair of extrusion apparatuses 401 and 402 extrude a thin sheet of cathode material 410 directly onto each surface of current collector 406. These first layers 410 passes through a first pair of cylindrical rollers 412, which apply an even pressure onto cathode layers 410 to adjust their thickness. The first assembly 414 consisting of cathode/current collector/cathode is then fed through the second pair of extrusion apparatus 403 and 404 extrude directly onto each surfaces of cathode layers 410 a thin sheet of electrolyte material 416. The final assembly 418 consisting of electrolyte/cathode/current collector/cathode/electrolyte is then fed through a second pair of cylindrical rollers 420, which apply an even pressure onto final assembly 418 to adjust the final thickness of the extruded assembly. As mentioned, the co-extrusion may be carried out with current collector 406 traveling vertically upward.

As in the previously described embodiment of FIG. 5, the co-extrusion apparatus illustrated in FIG. 7 may be complemented with measuring devices adapted to measure the thickness of the various layers. In this specific embodiment, two such measuring stations would be provided immediately after each pair of extrusion apparatus, so that the initial measurement of the extruded cathode layers 410 is taken without the interference of the electrolyte layers 416. One or two electronic units such as computers receive the measurement data and adjust the extruder's speeds, the thickness of the extruded sheets via internal adjustment means of each extrusion apparatus 401, 402, 403, and 404, and the pressure exerted by cylindrical rollers 412 and 420 in order to provide minute adjustments of the thickness of the various layers 410 and 416.

Figure 8:
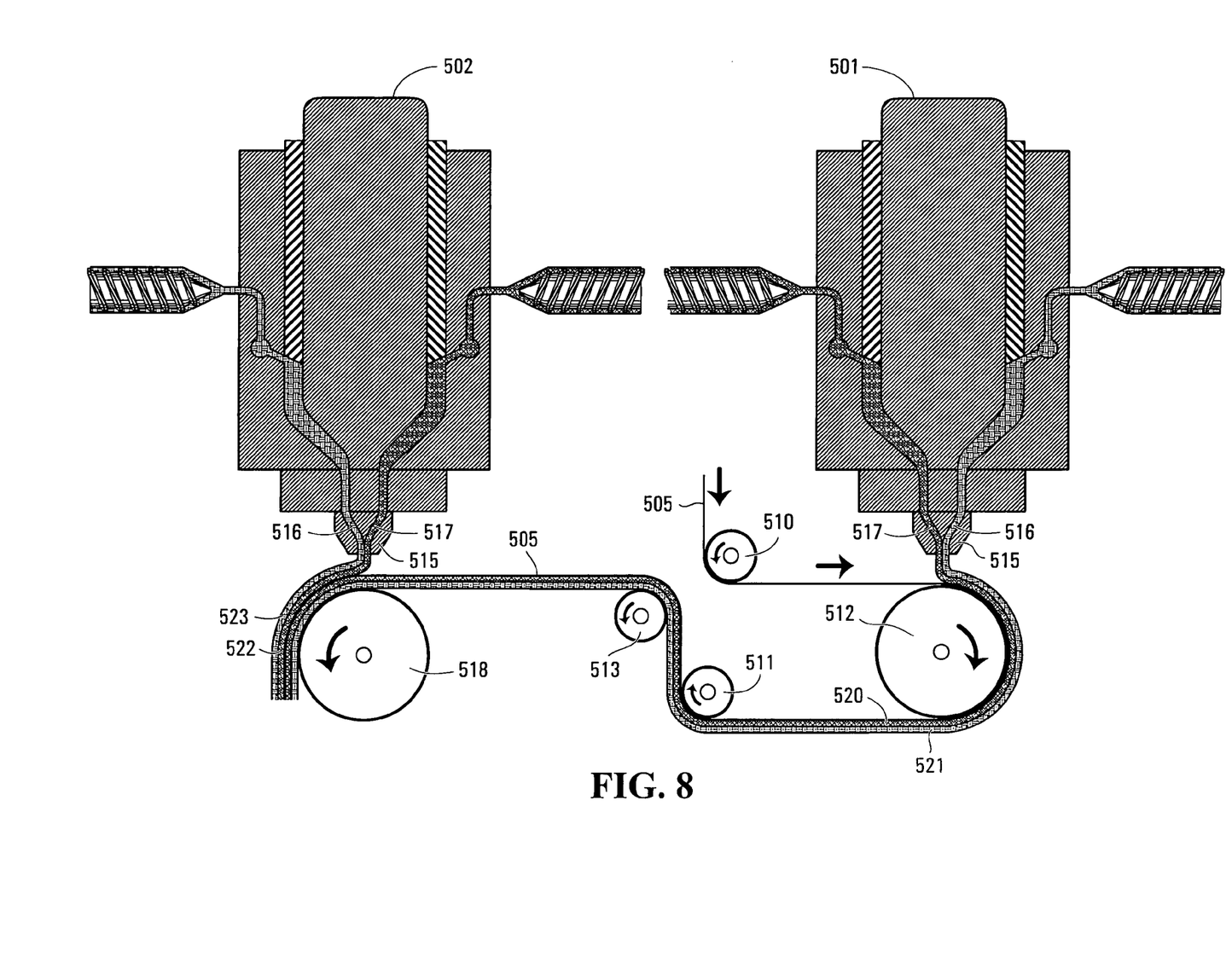
FIG. 8 is a schematic cross-sectional view of a co-extrusion apparatus according to a sixth embodiment of the invention.

FIG. 8 illustrates yet another variant of a co-extrusion process and apparatus in which two co-extrusion apparatus 501 and 502 similar to co-extrusion apparatus 10 illustrated in FIG. 1 are positioned on opposite sides of a moving current collector 505. Current collector 505 winds its way through a series of rollers that effectively turn the current collector upside down such that co-extrusion apparatus 501 coats one side of the current collector 505 and co-extrusion apparatus 502 coats the other side of the current collector 505. Each co-extrusion apparatus 501 and 502 comprises a double slot die 515 having a pair of flow channels 516 and 517. Flow channels 517 extrude thin sheets of cathode material directly onto each side of current collector 505, whereas flow channels 516 extrude a thin sheet of polymer electrolyte material over the previously laid thin sheets of cathode material. In operation, current collector 505 is initially re-directed by cylindrical roller 510 toward cylindrical roller 512 and co-extruder 501. Co-extruder 501 discharges a thin layer of cathode material 520 directly onto the current collector 505 and a thin layer of a polymer electrolyte material 521 directly onto the layer of cathode material 520 through the flow channels 516 and 517 of its double slot die 515 as the current collector 505 is supported by roller 512. The assembly of current collector 505, cathode layer 520 and polymer electrolyte layer 521 remains in contact with roller 512 for approximately ½ turn or 180°, and is directed through cylindrical rollers 511 and 513 and toward the nip of cylindrical roller 518 and co-extruder 502 with the current collector 505 facing the double slot die 515 of co-extruder 502. Co-extruder 502 discharges a thin layer of cathode material 522 directly onto the current collector 505 and a thin layer of a polymer electrolyte material 523 directly onto the layer cathode material 522 as the assembly is supported by roller 518. The bi-face half cell assembly of electrolyte 523/cathode 522/current collector 505/cathode 520/electrolyte 521 is then completed and either appropriately stored for future processing or directed to a subsequent manufacturing station for further processing. Cylindrical rollers 513 and 518 may be cooled and kept at a low temperature to prevent the polymer electrolyte layer 521 from undesirably adhering thereto. As previously described for co-extrusion apparatus 301 and 302, the discharge section of each double slot die 515 of co-extruder 501 and 502 may be angled relative to current collector 505 and its trajectory such that the extruded cathode layers 520 and 522 are appropriately laid first and then the polymer electrolyte layers 521 and 523 are suitably laid over the cathode sheets or layers 520 and 522. Nip rollers may also be positioned directly after co-extruders 501 and 502 to apply small pressure directly onto the surfaces of previously laid cathode and electrolyte layers to promote adhesion and surface leveling.

As described for the previous embodiments, the co-extrusion apparatus illustrated in FIG. 7 may be complemented with measuring devices adapted to measure the thickness of the various layers of the assembly.

Although the present invention has been described in relation to particular variations thereof, other variation and modifications are contemplated and are within the scope of the present invention. Therefore the present invention is not to be limited by the above description but is defined by the appended claims.

We claim:

1. A process of co-extrusion of a thin electrode sheet with a thin electrolyte polymer sheet directly onto a current collector sheet to form a bi-face assembly for a lithium polymer battery, said process comprising the steps of:
   (a) mixing a polymer with electrochemically active material, lithium salt and electronic conductive material in a first mixing chamber to form a first electrode slurry;
   (b) mixing a polymer with a lithium salt in a second mixing chamber to form a first electrolyte slurry;
   (c) feeding said first electrode slurry through a first flow channel and said first electrolyte slurry through a second flow channel;
   (d) mixing a polymer with electrochemically active material, lithium salt and electronic conductive material in a third mixing chamber to form a second electrode slurry;
   (e) mixing a polymer with a lithium salt in a fourth mixing chamber to form a second electrolyte slurry;
   (f) feeding said second electrode slurry through a third flow channel and said second electrolyte slurry through a fourth flow channel;
   (g) extruding said first electrode slurry in the form of a first thin electrode sheet through a first slot die opening connected to said first flow channel directly onto a first side of a moving current collector sheet;
   (h) concurrently extruding said first electrolyte slurry in the form of a first thin electrolyte sheet through a second slot die opening adjacent to said first die opening and connected to said second flow channel, said first thin electrolyte sheet being extruded directly onto said first thin electrode sheet;
   (j) extruding said second electrode slurry in the form of a second thin electrode sheet through a third slot die opening connected to said third flow channel directly onto a second side of the moving current collector sheet;
   (k) concurrently extruding said second electrolyte slurry in the form of a second thin electrolyte sheet through a fourth slot die opening adjacent to said third die opening and connected to said fourth flow channel, said second thin electrolyte sheet being extruded directly onto said second thin electrode sheet;
   wherein, the moving current collector sheet is guided in between the first and third slot die openings and between the second and fourth slot die openings;
   wherein said first and second thin electrode sheets and said first and second thin electrolyte sheets are extruded through a multiple slot die having four flow channels and four slot openings; and
   wherein said multiple slot die comprises a central channel adapted to guide said current collector between said four slot openings such that said first thin electrode sheet and said first thin electrolyte sheet are extruded on the first side of said moving current collector and said second thin electrode sheet and said second thin electrolyte sheet are extruded on the second side of said moving current collector thereby forming a bi-face electrochemical assembly.

2. A process of co-extrusion as defined in claim 1 further comprising means for adjusting the thickness of said first and second thin electrode sheets and the thickness of said first and second thin electrolyte sheets.

3. A process of co-extrusion as defined in claim 2 further comprising means for measuring said thickness of said first and second thin electrode sheets and said thickness of said first and second thin electrolyte sheets.

4. A process of co-extrusion as defined in claim 3 wherein said means for measuring is a measuring device selected from the group consisting of mechanical device, optical device, ultra-sonic device, Gamma gauge and Beta gauge.

5. A process of co-extrusion as defined in claim 3 further comprising an electronic control unit linked to said means for measuring said thickness and to said means for adjusting the thickness; said electronic control unit receiving measurement data from said means for measuring said thickness, comparing said received measurement data to pre-set thickness tolerances stored into memory and, when thickness measurement fall outside the preset tolerances, sending signals to said means for adjusting the thickness to effect adjustment of the extruded layers.

6. A process of co-extrusion of a thin electrode sheet with a thin electrolyte polymer sheet directly onto a current collector sheet to form a bi-face assembly for a lithium polymer battery, said process comprising the steps of:
   (a) mixing a polymer with electrochemically active material, lithium salt and electronic conductive material in a first mixing chamber to form a first electrode slurry;
   (b) mixing a polymer with a lithium salt in a second mixing chamber to form a first electrolyte slurry;
   (c) feeding said first electrode slurry through a first flow channel and said first electrolyte slurry through a second flow channel;
   (d) mixing a polymer with electrochemically active material, lithium salt and electronic conductive material in a third mixing chamber to form a second electrode slurry;
   (e) mixing a polymer with a lithium salt in a fourth mixing chamber to form a second electrolyte slurry;
   (f) feeding said second electrode slurry through a third flow channel and said second electrolyte slurry through a fourth flow channel;
   (g) extruding said first electrode slurry in the form of a first thin electrode sheet through a first slot die opening connected to said first flow channel directly onto a first side of a moving current collector sheet;
   (h) concurrently extruding said first electrolyte slurry in the form of a first thin electrolyte sheet through a second slot die opening adjacent to said first die opening and connected to said second flow channel, said first thin electrolyte sheet being extruded directly onto said first thin electrode sheet;
   (j) extruding said second electrode slurry in the form of a second thin electrode sheet through a third slot die opening connected to said third flow channel directly onto a second side of the moving current collector sheet;
   (k) concurrently extruding said second electrolyte slurry in the form of a second thin electrolyte sheet through a fourth slot die opening adjacent to said third die opening and connected to said fourth flow channel, said second thin electrolyte sheet being extruded directly onto said second thin electrode sheet;
   wherein, the moving current collector sheet is guided in between the first and third slot die openings and between the second and fourth slot die openings;
   wherein said first and second electrode sheets are extruded on the first and second side of said moving current collector respectively through a first slot die having a pair of flow channels and the first and third slot die openings and said first and second electrolyte sheets are extruded directly onto said first and second electrode sheets respectively through a second die having a pair of flow channels and the second and fourth slot die openings;

wherein said first slot die comprises a central channel adapted to guide said moving current collector between said pair of flow channels such that a thin electrode sheet is extruded on both sides of said current collector; and wherein said second slot die comprises a central channel adapted to guide said moving current collector with said first and second electrode sheets between said pair of flow channels such that said first and second electrolyte sheets are extruded onto said first and second electrode sheets respectively on both sides of said moving current collector sheet thereby forming a bi-face electrochemical assembly.

7. A process of co-extrusion as defined in claim 6 further comprising means for adjusting the thickness of said first and second thin electrode sheets and the thickness of said first and second thin electrolyte sheets.

8. A process of co-extrusion as defined in claim 7 further comprising means for measuring said thickness of said first and second thin electrode sheets and said thickness of said first and second thin electrolyte sheets.

9. A process of co-extrusion as defined in claim 8 wherein said means for measuring is a measuring device selected from the group consisting of mechanical device, optical device, ultra-sonic device, Gamma gauge and Beta gauge.

10. A process of co-extrusion as defined in claim 8 further comprising an electronic control unit linked to said means for measuring said thickness and to said means for adjusting the thickness; said electronic control unit receiving measurement data from said means for measuring said thickness, comparing said received measurement data to pre-set thickness tolerances stored into memory and, when thickness measurement fall outside the preset tolerances, sending signals to said means for adjusting the thickness to effect adjustment of the extruded layers.

* * * * *